Aug. 13, 1946.  J. BUECHEK  2,405,684
DOUGH TWISTING MACHINE
Filed Sept. 16, 1943   7 Sheets-Sheet 1

INVENTOR.
JOHN BUECHEK.
BY Lockwood, Goldsmith & Galt,
ATTORNEYS.

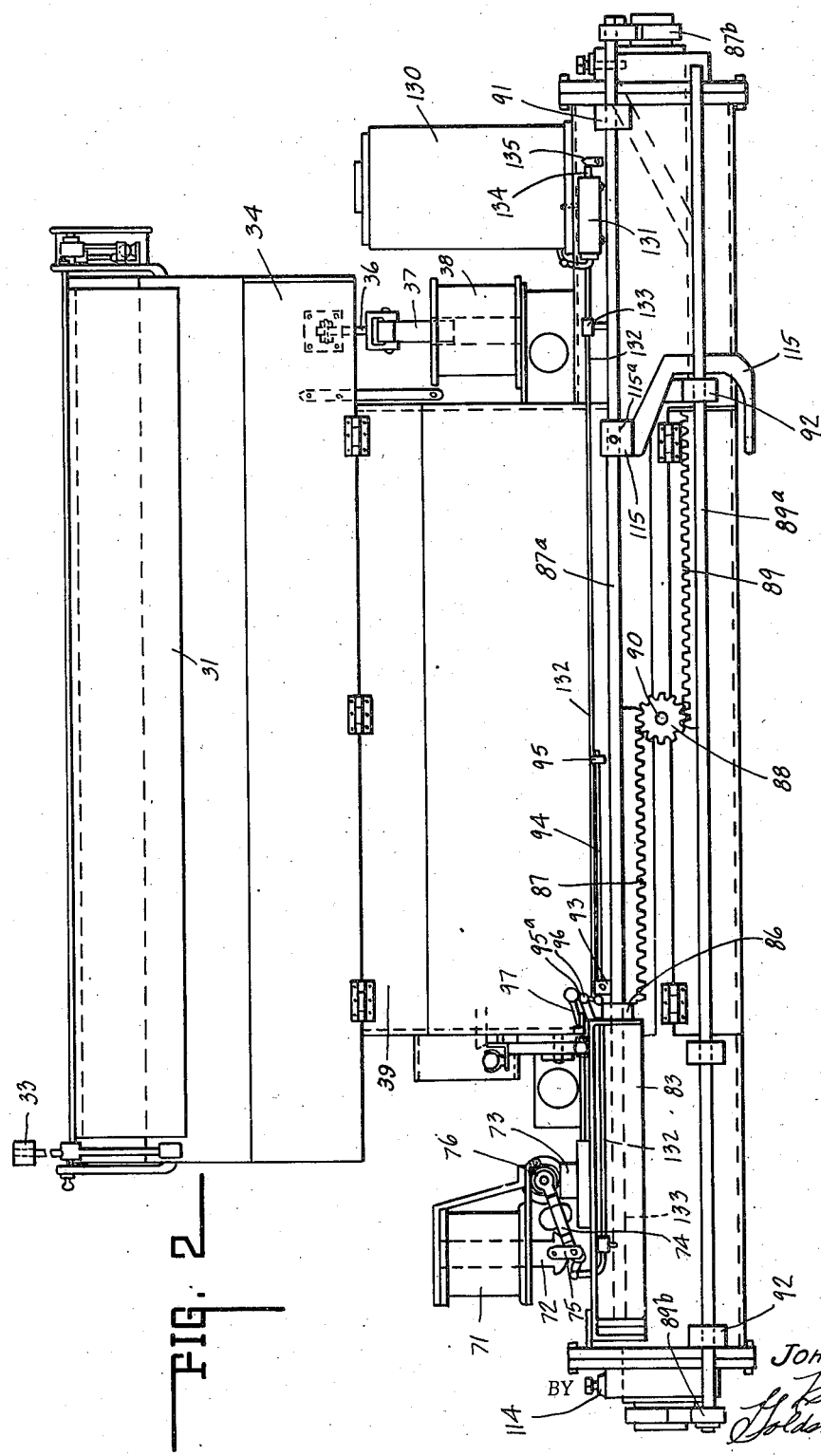

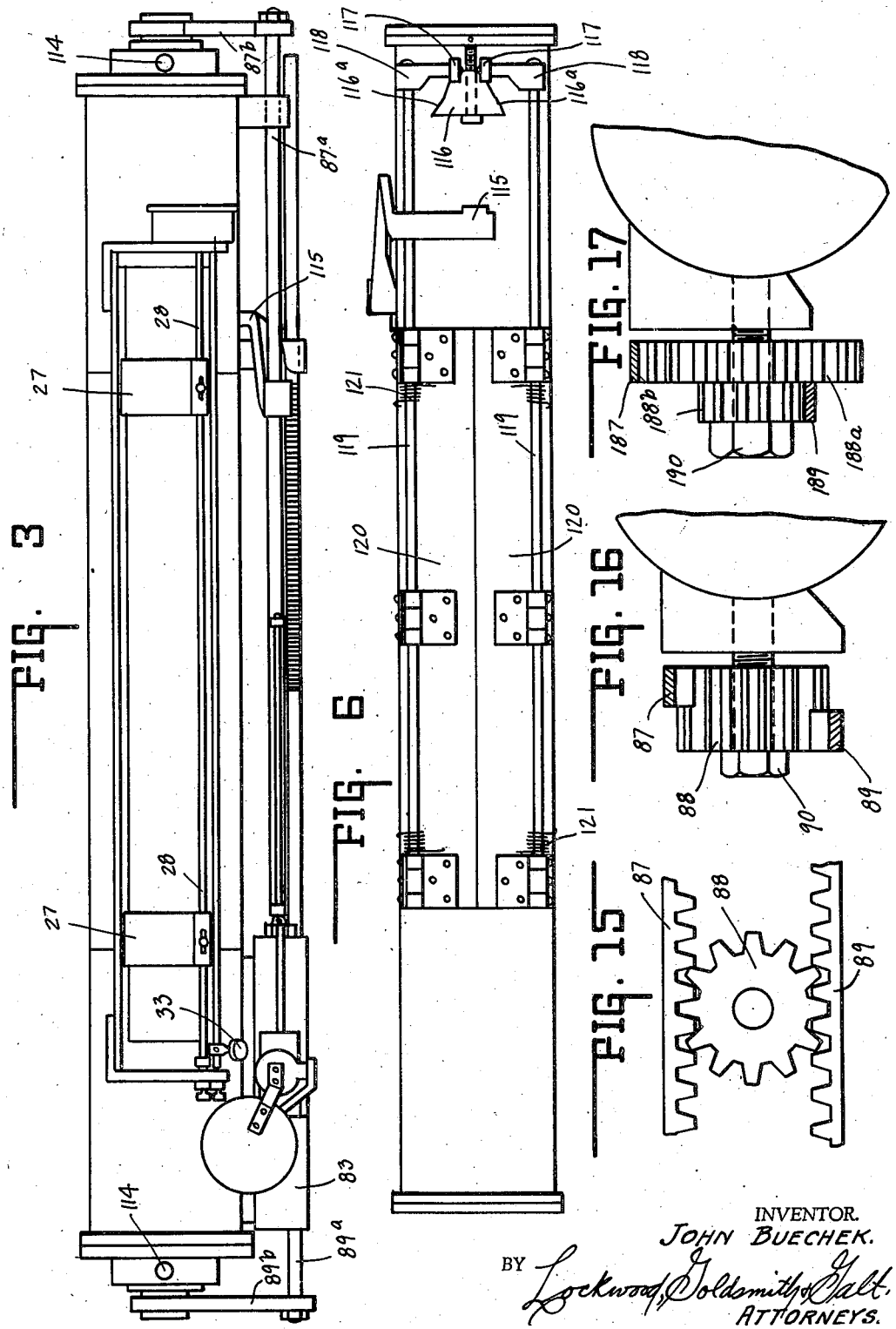

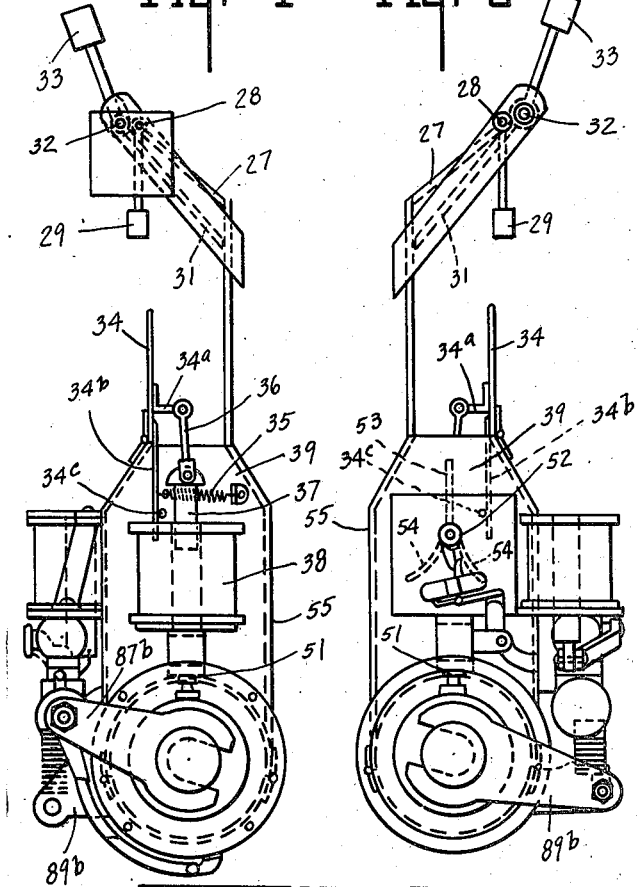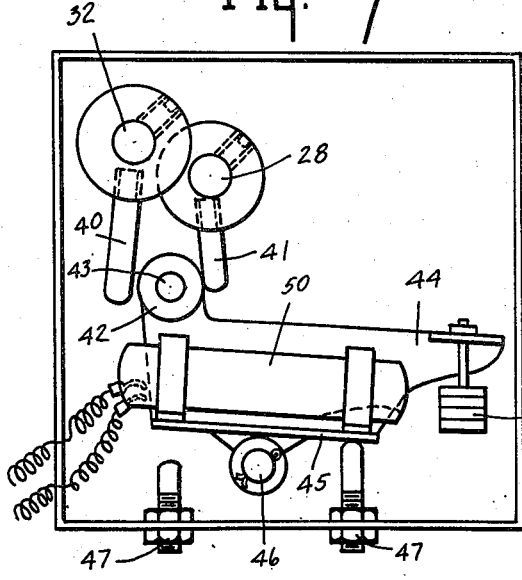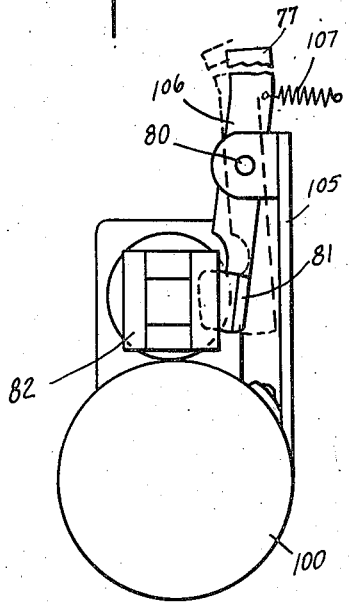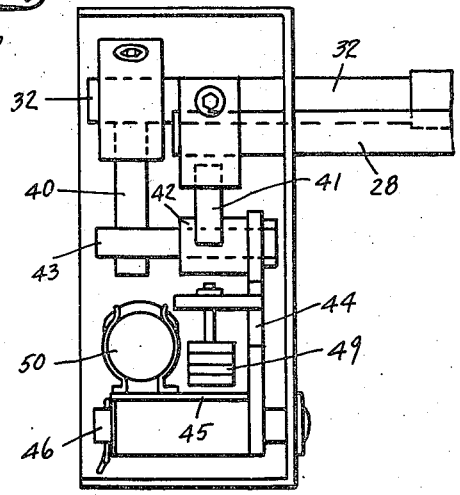

Aug. 13, 1946.   J. BUECHEK   2,405,684
DOUGH TWISTING MACHINE
Filed Sept. 16, 1943   7 Sheets-Sheet 5
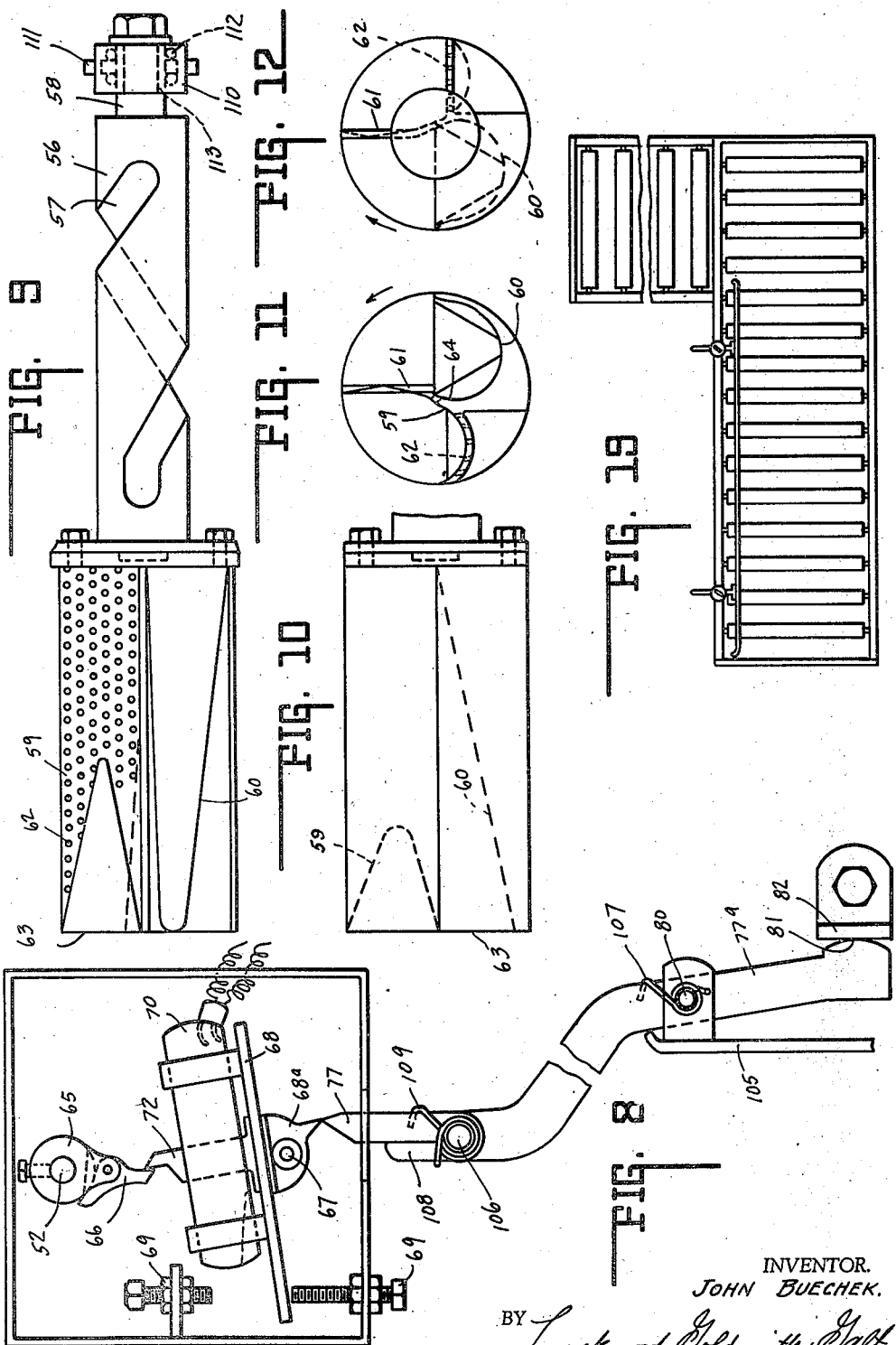
INVENTOR.
JOHN BUECHEK.
BY Lockwood, Goldsmith & Galt,
ATTORNEYS.

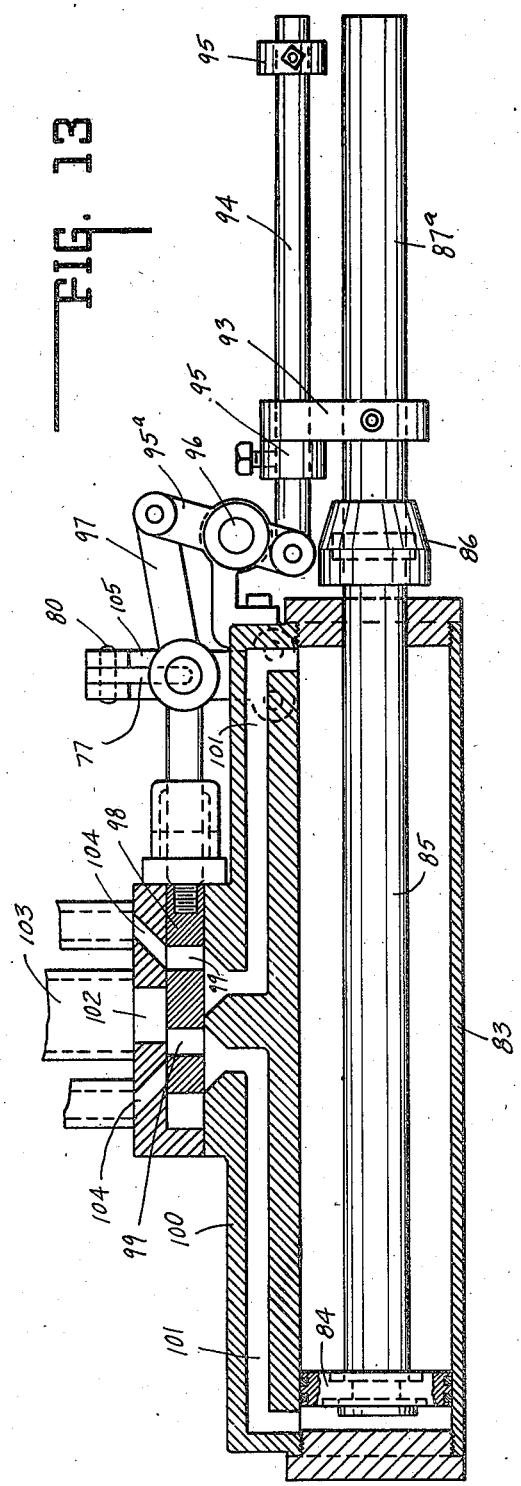

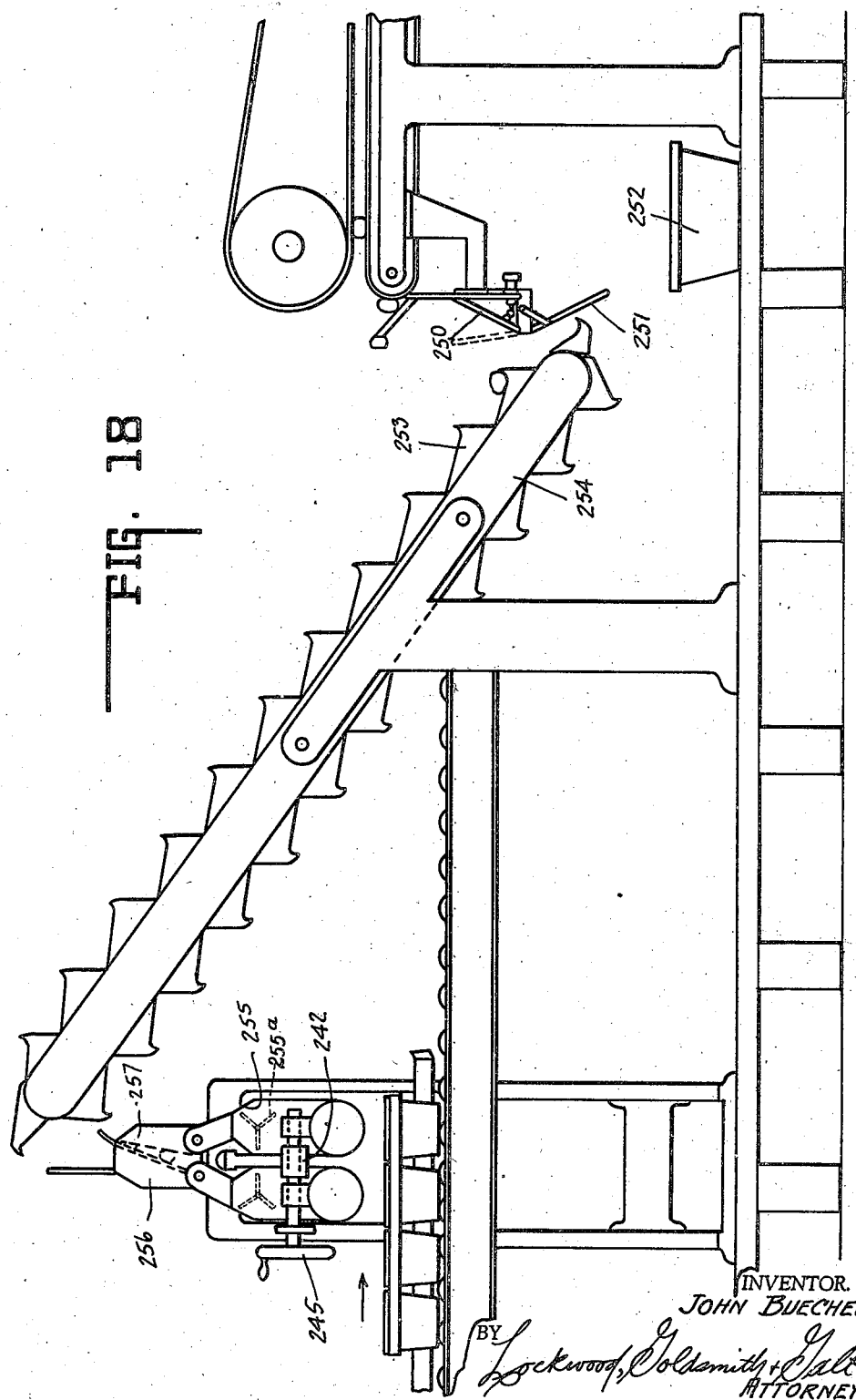

Patented Aug. 13, 1946

2,405,684

UNITED STATES PATENT OFFICE 2,405,684

DOUGH TWISTING MACHINE

John Buechek, Kokomo, Ind.

Application September 16, 1943, Serial No. 502,556

22 Claims. (Cl. 107—8)

This invention relates to a method of and apparatus for twisting dough to form a twisted loaf of bread.

Twisting has two desirable results: The actual twisting eliminates air or gas pockets in the dough so that the loaf when baked has a better and uniform texture and no holes. Twisting also provides in the loaf preformed curvatures at the top so that upon baking, the top surface does not split open and upon cooling the top surface does not wrinkle. All this is well known in the baking industry and these desirable results warrant the expense of twisting, usually hand performed but in some instances machine performed.

The usual difficulty in the latter is the dough material aggregates or doubles and the twisting machine cannot handle such formations. Another difficulty is that some machines attempt twisting a single length of dough so that again the inherent nature of the material causes difficulty.

The present invention contemplates providing two lengths of dough and simultaneously twisting same without elongation thereof by a pair of conforming, separated double spirals that while rotating gradually separate so that when separated axially the twisted dough (non-elongated) is free of the spirals and ready for discharge into the baking pan.

The two lengths do not engage each other until the spiral separating vane passes therefrom. Likewise the twisting is from an intermediate portion towards the ends of said lengths.

The present invention is readily adapted to apply three or four twists per loaf and for different length loaves as hereinafter set forth.

For an understanding of bread production it appears appropriate to briefly set forth that the large dough mass is supplied from and by a divider in small chunks to a rounder by a suitable conveyor. From the rounder, which makes a ball of each mass and compacts the mass to eliminate gas and air pockets, the ball goes to an overhead proofer where the yeast starts to work or livens up the mass. From the proofer the ball discharges to a molder and this in turn to an elongator which consists of a pair of similarly moving belts, the two moving in the same direction but at different speeds so that mass elongates. This elongated dough mass when discharged is then twisted with another mass and by hand and then placed in a greased pan in which it is baked.

In this operation if one dough mass touches another in any previous operation the two masses form a double and it must be tossed out. Now for machine twisting this double must be mechanically separated out.

Also for machine twisting, all lengths should not exceed a predetermined selected length and each length should be properly centered. If overweight (a double), too long, or improperly centered the present invention automatically discards such mass.

Then two of the proper elongated masses are brought together but in separated relation and twisted automatically and when properly twisted released first for mutual contact and then for deposit into the baking pan. The present invention also contemplates greasing the twisted mass so that pan greasing is unnecessary. The invention also is readily duplicated so that the relatively slower operation, twisting, does not require prior operations to be slowed down to conform but permits the divider, rounder and proofer to operate at maximum capacity.

Other objects and features of the invention will be set forth more fully hereinafter.

Since the method of selecting, centralizing, twisting and panning can be better understood in connection with a description of the machine, reference accordingly will be had thereto.

The full nature of the invention will be understood from the accompanying drawings and the following description and claims:

In the drawings

Fig. 2 is a side elevation of the single unit twister and ejector.

Fig. 3 is a top plan view thereof.

Fig. 4 is an end view thereof corresponding to Fig. 1.

Fig. 5 is a similar view of the opposite end.

Fig. 6 is a bottom plan view of the discharge end of the twister.

Fig. 7 is an elevational view of the ejector control switch.

Fig. 7A is a view at right angles thereto.

Fig. 8 is an elevational view of the power control switch.

Fig. 9 is a top plan view of the twisting plunger and spiral drive.

Fig. 10 is a side view of the twisting plunger.

Fig. 11 is an end view looking to the right in Fig. 10, see line 11—11 and arrows therein.

Fig. 12 is a similar view from the opposite end.

Fig. 13 is a diagrammatic view of the power cylinder, etc.

Fig. 14 is an elevational view of a switch lever.

Fig. 15 is a diagrammatic view of the rack and pinion drive.

Fig. 16 is a view at right angles thereto.

Fig. 17 is a corresponding view of a modified form utilized for a "three" twist loaf.

Fig. 18 is an elevational view of the discharge end of an elongator, an ejector, a dual unit twister, intermediate transfer device, and pan conveyor.

Fig. 19 is a plan view of the latter.

Figure 1:
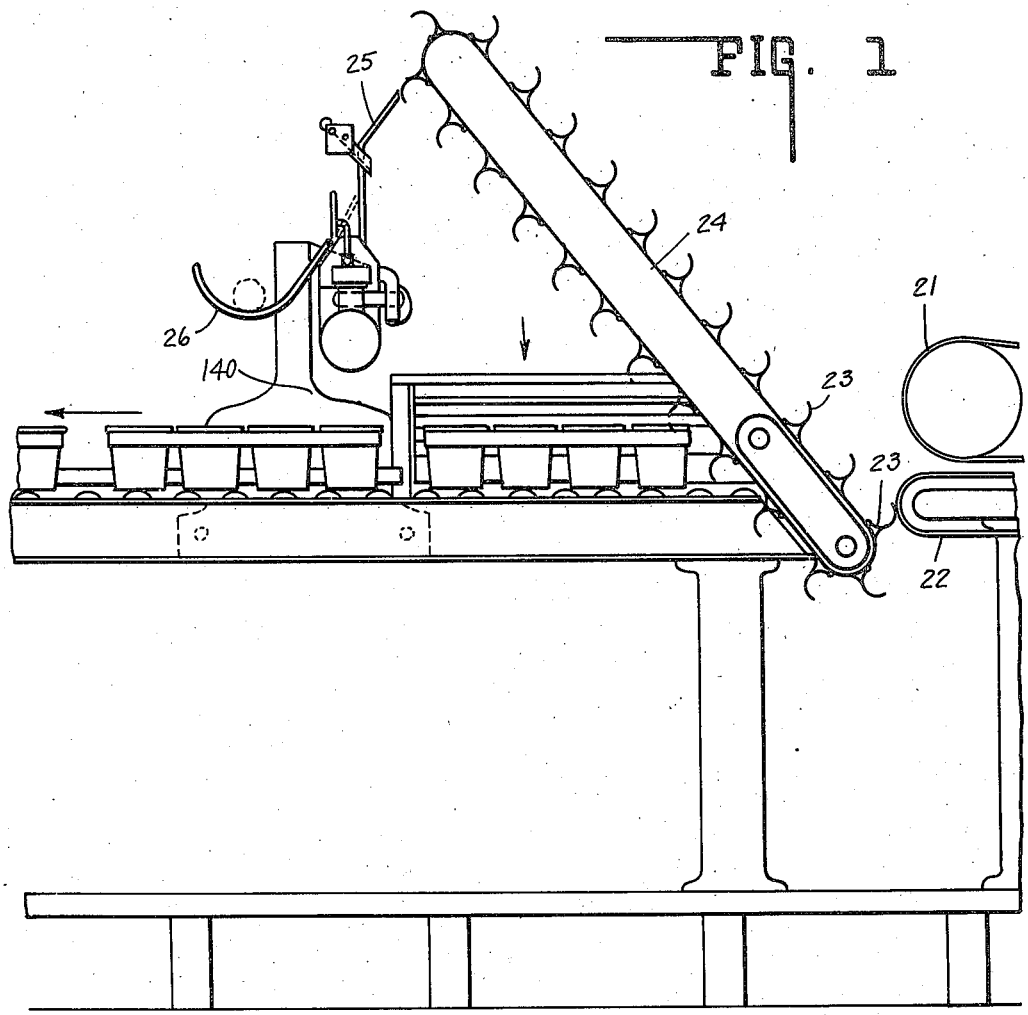
Fig. 1 is an elevational view of the discharge end of an elongator, a single unit twister and ejector, an intermediate transfer device and the receiving end of a pan conveyor.

In Fig. 1 21 indicates an upper belt and 22 a lower belt of an elongator, the belts moving in the same direction but at different speeds, the top belt being the faster one. The elongated piece of dough discharges from the latter into the adjacent pocket 23 of an endless conveyor 24 having a series of said pockets, said pockets receiving such elongated dough masses.

The elongated masses are conveyor elevated and pocket discharged to a downwardly inclined chute 25 to an ejector device. If such mass is a double, too long or improperly centered the ejector device discards same, discharging to waste receiver 26. This dough so thrown out then may be recovered and reworked as desired.

Reference will now be had more particularly to Figs. 2 to 5 inclusive wherein Fig. 4 duplicates a portion of Fig. 1 but to a larger scale. A pair of fins 27 are carried by rod 28. They are independently adjustable thereon and towards and away from each other. These fins gauge the length of the dough mass and centering thereof for if the dough mass rests thereon the rod 28 will rock even though constrained by counter weight 29.

Fast production bake shops handle about 4000 pounds of dough per hour and the water loss is about 12½ percent so that this mass should make about 3500 pounds of bread when baked whether in pound or pound and a half size loaves. The elongated masses for the former will run from 12 to 13 inches in length and for the latter from 14 to 16 inches in length. Accordingly the several blades to be described should be a minimum of eighteen inches in length if each finger or fin 27 is an inch wide or so, so that the gap therebetween of 12 to 16 inches will pass an elongated mass and the blade beneath the fins 27 will be engaged by such passed mass.

Immediately beneath the fins accordingly is the leveling blade 31 aforesaid, carried by shaft 32 and counter balanced by weight 33. This blade levels or straightens the elongated mass if it passes the ejector fins 27.

Immediately below the aforesaid is the throw out or ejector blade 34 which is normally constrained, see spring 35, Fig. 4, to mass passing position. Connected to said ejector blade 34 is an arm 34a connected by link 36 to the plunger 37 of a solenoid 38. When energized the solenoid 38 tilts blade 34 clockwise in Fig. 4 to catch the dough mass to be ejected before it passes into throat 39 and thus blade 34, when tilted, discharges the refused mass to collector 26, see Fig. 1.

Reference will now be had to Figs. 7 and 7a for an explanation of the solenoid control. If the elongated mass properly passes the fins 27, observe Fig. 7, the arm 40 on shaft 32 tilts clockwise and has no effect. If, however, fins 27 are engaged, arm 41 on shaft or rod 28 engages roller 42 carried by spindle 43 in turn carried by a flange 44 of a switch carrying base 45 pivoted at 46 and selectively engaging adjustable stops 47 for limiting the positions or throw thereof. The base 45 is constrained by means 49 to open circuit position as shown in Fig. 7.

When tilted counter-clockwise, the switch 50, see Fig. 7, closes the circuit across the contacts shown and same by the wires illustrated connect to solenoid 38. Solenoid 38 when energized will pull down on plunger member 37 and blade 34 forthwith tilts clockwise, Fig. 4, to the intercepting position. The solenoid has an adjustable dash pot action including adjustable air control 51. This regulates the quickness of return of blade 34 by the spring 35 when once moved to intercepting position.

If blade 31 and fins 27 are positioned a sufficient distance from ejector blade 34 the aforesaid dashpot holding of blade 34 is not required. Since blade 31 and fins 27 move almost together, as it were, arm 40 does not interfere with switch closing. As soon as the mass passes from fins 27, arm 41, by reason of the weight 29, returns counter clockwise to the position shown in Fig. 7. When the mass passes blade 31, the arm 40, by reason of weight 33, returns counter clockwise to the position shown in Fig. 7. In so doing it engages spindle 43 see Figs. 7 and 7a, to tilt clockwise the switch base 45 to at least past center whereupon weight 49 returns the base to the position shown in Fig. 7. As stated stops 47 determine the extreme positions, and only sufficient circuit closing interval is required to actuate plunger 37, the dashpot 51 holding ejector blade 34 in trapping or intercepting position long enough to intercept and eject the mass which initiated the ejection cycle. The mass on plate 34 holds it in diverting position until the mass passes laterally (to the left in Fig. 4) whereupon it rolls away and is then effective with spring 35 to return the diverter to non-diverting position and by this time the dash pot holding effect is substantially completed.

Referring again to Figs. 2 to 5 inclusive there is illustrated a subsequent and another triple vaned diverter, pivoted at its center 52, which is a shaft mounted in throat 39. An upper median blade 53 and two diverging blades 54 are so arranged that blade 53 alternately inclines towards one side of the throat 39 and then the other. As the mass rolls along blade 53 onto one blade 54 it tilts the diverter and then it discharges the mass to one side of housing 55. The next mass similarly tilts the diverter oppositely and discharges the mass to the other side of the housing.

In the housing, below the throat 39 including diverter 53—54, are the twisting plungers of which there are two. These are longitudinally aligned and substantially abut each other at their adjacent ends when the elongated masses are diverter supplied. These plungers each include a spiral grooved shaft 56 having groove 57 therein and a driving end 58. Detachably secured to shaft 56 is the twisting portion which consists of two channels 59 and 60 side by side, and separated by vane 61. Channel 59 is perforated as at 62 for oil discharge. The channels are inclined from the abutting face 63 and channel 59 is a shorter one as shown in Figs. 9 and 10. Channel 60 undercuts channel 59 at 64, see Fig. 11.

Reference will now be had to the twister control which is automatic. It will be remembered diverter plate 53—54 has shaft 52 and, referring to Fig. 8, this shaft mounts arm 65 which pivotally supports a one-way dog or pawl 66. Thereneath in the switch box is pivoted at 67 a switch carrier base 68, the throw of which is limited by adjustable stops 69. Switch 70 controls solenoid 71 having plunger 72 that is connected to a power fluid valve.

In the foregoing when the diverter 53—54 is tilted counter clockwise, Fig. 4, arm 65 tilts similarly causing pawl 66 to pick up trigger 72 on base 68 tilting the switch to the "on" or closed circuit position. This energizes the solenoid 71 which actuates the power valve 73 by means of arm 74 and link 75. A coiled spring 76 about the valve constrains same to the closed valve position.

The switch is returned to "off" position by arm 77, see Figs. 8 and 14. This arm is pivoted at 80 and the tail portion 81 is engaged by the engaging member 82 at the appropriate time, as set forth hereinafter.

*Power*

A single power cylinder 83, see Figs. 2 and 3 and Fig. 13 includes a double acting piston 84 carried by rod 85 that is connected at 86 to a rack bar 87, see also Figs. 15 and 16 as well as Fig. 2. This rack meshes with pinion 88 in turn meshing with lower rack 89. Pinion 88 is carried by shaft 90. Rack bar 87 is guided as at 91 and rack bar 89 is guided similarly at 92.

Rigid with bar 87 is an adjustable cross bar 93. Rod 94, parallel to rack 87 mounts spaced adjustable stops 95 alternately engageable by cross bar 93 therebetween. Rod 94 accordingly is reciprocated by rack bar 87 at each end of the stroke of rack 87. Rod 94 is connected to lever 95a pivoted at 96 to which is also connected link 97 connected to the reversing sliding plate valve 98 having two ports 99 therethrough.

The valve body 100 is mounted on cylinder 83 and includes two channels 101 to opposite ends of the said cylinder. It also includes a single passage 102 connected to pressure line 103 controlled by the valve 76 shown in Fig. 2 and previously described. The body 100 also has two relief passages 104. Hence, in the absence of any other control the plate valve would reciprocate and the power piston would reciprocate. This type of power, i. e., cylinder and piston and plate valve per se is conventional.

When the power has moved the racks to the full extent of their strokes and returned same, the power is cut off by actuation of the means for controlling the valve 73, and when this is effected, spring 76 closes that valve and holds it closed until the valve initiating control previously specified is again actuated. However, the plate is now in position to properly secure proper power piston travel.

The second mentioned control for valve 73 is as follows, see Figs. 13 and 14. Bracket 105 carried by the valve body 100 pivotally supports at 80 lever 77 aforesaid, so that upon completion of one power cycle the main pressure is released when the valve is released to its constraint (spring 76) for closure. Note that lever 77 is split as at 106 and the switch carrier 68 actuating end 77 is spring constrained as at 109 while the lower end 77a having contact portion 81 and pivoted at 80 is spring constrained at 107. Note arm 77a has abutment 108 for unitizing 77 and 77a in clockwise rotation thereof by member 82, etc., for moving the carrier 68 to open circuit position.

Rods 87a and 89a, rigid with racks 87 and 89 respectively, each mount, at the end that projects to the end of the machine, a yoke 87b and 89b, see Figs. 2 to 5 inclusive. These yokes are operatively connected to the pin structures, see Fig. 9 on the outer ends of the shafts 56—58 of the two twisters. End thrust collar 110 mount pins 111 and encompasses opposed ball thrust bearings 112 riding opposite sides of ring collar 113 rigid with end 58.

As the yokes move out away from each other, see Fig. 3, the spiral thread 57, by reason of stationary pin 114, causes the twisters to rotate and in opposite directions. Similarly this rotation is effected in reverse directions when the twisters are brought together.

Figs. 2 and 3 show rod 87a mounting arm 115. This arm, see Fig. 6, engages abutment 116 and this moves to the right in said figure. It is spring constrained. This abutment 116 has opposed cam faces 116a which simultaneously engage rollers 117 carried by arm 118 rigid with shafts 119. These shafts carry half-doors 120 which close the bottom of the housing 55. These doors by springs 121 are normally constrained to closed position.

When arm 115 actuates abutment 116 at the end of the separating movement of the twisters the doors open and the twisted loaf is discharged to the pan therebeneath.

Note that from the substantially abutting position of the twisters to the last mentioned position the twisters actually rotate about 360°, thereby forming four twists in the two elongated masses. As the twisters recede from each other the two masses are brought together by withdrawal of vanes 61. When the twisters are fully separated the four twist mass rests upon the doors ready for discharge to pan therebeneath.

Following discharge the twisters immediately complete the return cycle and when this is accomplished the twisters are stationary and ready to receive two additional elongated masses which when the second one is supplied initiates a second cycle as aforesaid.

Reference will now be had more particularly to Fig. 2 and Figs. 9 to 12. In the former there is provided a reservoir 130 which contains a vegetable oil such as "Mellow Crust." This reservoir feeds to cylinder 131 from which at one end leads a discharge line 132 having restricted ports or discharge nozzles 133, preferable check-relief controlled so that it will hold the line supply until extra pressure is applied.

This extra pressure is applied by a piston (not shown) in cylinder 131 having a rod 134 actuatable by lever 135. This is engaged near the end of the separating stroke of the twisters by portion 115a of the arm 115. At this time the twisters contain no dough and are positioned substantially as they are when abutting or as shown in Figs. 11 and 12. This oil sprayed on the twisters then flows over the surface of the two channels 60 only for the nozzles are slightly offset from the median vertical plane. Any oil that should get in channel 59 drains through apertures 62 to the doors and into the pan below same.

The purpose of the aforesaid is three-fold. First the advancing elongated mass on channel 60 should slip as it is twisted, hence the twisting does not draw or drag on the mass and it does not elongate. The mass in channel 59 has such a slight drag and this is intentional. Second this lubrication eliminates the necessity of using dusting flour. Third, this lubrication eliminates the necessity of pan greasing, for in the process the entire twisted mass when released is fully coated.

A modified form of the invention is shown in Fig. 17. This is for short loaves, that is one with but three twists therein, since the length is insufficient to include four twists therein. In Fig. 17 shaft 190 mounts a double gear or pinion having portions 188a and 188b, the former meshing with rack 187 and the latter with rack 189. Since all controls are operated from the top rack bar, etc., it is quite evident that the left hand twister in Figs. 2 and 3 (not shown) will rotate half as fast as the right hand twister and separate but half the total possible separation distance.

The only adjustments required, other than changing gear 188a—188b for gear 88, is to shift the left hand fin or finger 27 one-quarter distance and shift the entire machine one-quarter distance to properly receive the elongated dough mass from the conveyor 24.

Figure 20:
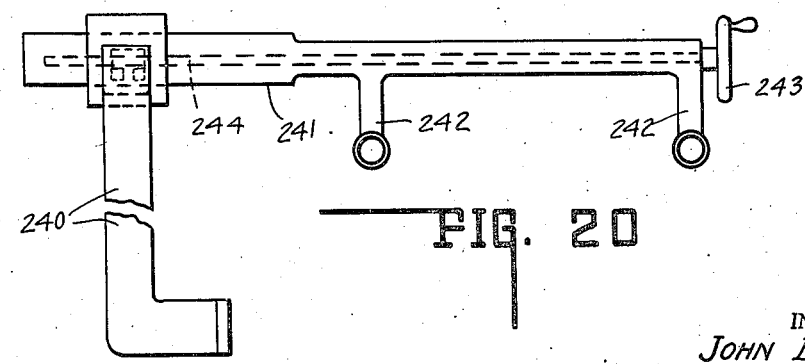
Fig. 20 is an elevational view of a bracket adapted to mount a single or dual unit twister.

Referring to Fig. 1, the aforesaid shifting is effected by shifting the several structures all carried by bracket 140. As shown in Fig. 20, such a bracket 240 carries the overhanging support 241 with two depending hangers 242. The hand wheel 243 and screw 244 serve to move support 241 as required. This also is arranged to mount a double unit stick as shown in Fig. 18.

In Fig. 18 one depending support 242 is illustrated and for clearness handwheel 243 is omitted. A cross bar 244 mounted on 243 supports at opposite sides of support 242 a single unit and hand-wheel 245, through a screw, etc., not shown, can move said units towards and away from each other to allow for different pan strap differences.

Also Fig. 18 illustrates the ejector mounted at the end of the elongator. Herein whenever ejector blade 250 is, through the fin or finger control, caused to elevate vertically, see dotted lines, the dough passes down to baffle 251 and thence to collector 252.

If the mass is proper in all respects it falls on plate 250 and discharges to a pocket 253 on endless conveyor 254. Each unit, see left hand end of Fig. 18, is identical and includes the receiving throat 255 in which is mounted a mass operable diverter 255a like diverter 52, 53, 54, illustrated in Fig. 5. Thereabove is a supplementary housing 256 which has in it an additional mass operable diverter 257 similar to those in throats 255 and in throat 39. As the first mass discharges to the uppermost throat, diverter 257 feeds it to the left hand unit throat, the second mass feeds to the right unit throat, then the third mass feeds to the left hand unit throat and the fourth mass then feeds to the right unit throat and successive masses are similarly deflected or diverted.

However, the alternate masses fed to same throat are fed first to one side of the unit housing and then to other side thereof and when the two masses are so fed into the unit the twisting is initiated in that unit. Since each unit is substantially independent one set of twisters is operated before the other set begins operation.

Fig. 19 is illustrative of a pan conveyor structure for use with the form of the invention shown in Fig. 18. Note that as between Figs. 1 and 18, the former combines the ejector and twister units whereas in the latter these are separated by the conveyor between the elongater and the twisters. This has the advantage that two ejectors are not required for dual twisters.

The dual embodiment is particularly advantageous for fast production shops and the specific form illustrated reduces the head room necessary.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In dough handling apparatus the combination a twister device and a selector, the latter successively receiving elongated dough masses, said selector including a pair of spaced fingers arranged to pass therebetween the desired masses, an ejecting plate therebeneath, and means operable by mass engagement of a finger for moving said plate to mass intercepting position, said plate when not finger actuated normally permitting mass passage to the twister device.

2. Dough handling apparatus as defined by claim 1 wherein said means includes a solenoid member and plunger member, one member having operative connection to the plate and the other member being stationarily mounted, spring means constraining the plate to mass passing position, and switch means operable by a finger to energize said solenoid member.

3. Dough handling apparatus as defined by claim 1 wherein said means includes a solenoid member and plunger member, one member having operative connection to the plate and the other member being stationarily mounted, spring means constraining the plate to mass passing position, and switch means operable by a finger to energize said solenoid member, a second plate interposed between the fingers and ejector plate and normally constrained to mass engaging position and engageable by each mass, and means operable in the return movement of the second plate to mass engaging position to return said switch means to open circuit position.

4. Dough handling apparatus as defined by claim 1 wherein said means includes a solenoid member and plunger member, one member having operative connection to the plate and the other member being stationarily mounted, spring means constraining the plate to mass passing position, and switch means operable by a finger to energize said solenoid member, a second plate interposed between the fingers and ejector plate and normally constrained to mass engaging position and engageable by each mass, and means operable in the return movement of the second plate to mass engaging position to return said switch means to open circuit position, and a dashpot control effective following solenoid energization to retard ejector plate return by said spring means.

5. Dough twisting apparatus including in combination a pair of longitudinally aligned twisters reciprocable toward and away from each other and normally in substantially abutting relation, each having a pair of adjacent mass receiving longitudinally directed channels therein, the channels of the twisters being aligned with each other when in substantially abutting relation, a diverter above the twisters and dough mass oscillatable in mass passage to the twisters, means for simultaneously rotating and separating the twisters, and other means operable upon second mass movement of the diverter for initiating operation of said first mentioned means.

6. Dough handling apparatus as defined by claim 5 wherein the first mentioned means is of reversible character, the twisters following initiation of twisting operation separating until the two masses are twisted together, the twisted singular dough mass passing between the separated ends of the twisters, the twisters then moving towards each other, and means stopping the operation of the first mentioned means when the twisters have returned to substantially abutting relation.

7. Dough handling apparatus as defined by claim 5 wherein the twisters are housed within a housing having an open upper end in which is mounted the diverter and door means for the lower end, the twisted portion of the mass resting on said door means until twisting is completed, and door opening means operable at the end of the separating movement of the twisters for releasing the twisted mass from the housing when the mass is freed from the retracted twisters.

8. Dough handling apparatus as defined by claim 5 wherein the first mentioned means is of reversible character, the twisters following initiation of twisting operation separating until the two masses are twisted together, the twisted singular dough mass passing between the separated ends of the twisters, the twisters then moving towards each other, means stopping the operation of the first mentioned means when the twisters have returned to substantially abutting relation, a housing for said twisters, having an open upper end in which is mounted the diverter and door means for the lower end, the twisted portion of the mass resting on said door means until twisting is completed, and door opening means operable at the end of the separating movement of the twisters for releasing the twisted mass from the housing when the mass is freed from the retracted twisters.

9. Dough handling apparatus as defined by claim 5 wherein the first mentioned means is of reversible character, the twisters following initiation of twisting operation separating until the two masses are twisted together, the twisted singular dough mass passing between the separated ends of the twisters, the twisters then moving towards each other, means stopping the operation of the first mentioned means when the twisters have returned to substantially abutting relation, and means for lubricating certain channels of the twisters following twisted singular mass removal therefrom.

10. Dough handling apparatus as defined by claim 5 wherein the first mentioned means is of reversible character, the twisters following initiation of twisting operation separating until the two masses are twisted together, the twisted singular dough mass passing between the separated ends of the twisters, the twisters then moving towards each other, means stopping the operation of the first mentioned means when the twisters have returned to substantially abutting relation, a housing for said twisters, having an open upper end in which is mounted the diverter and door means for the lower end, the twisted portion of the mass resting on said door means until twisting is completed, door opening means operable at the end of the separating movement of the twisters for releasing the twisted mass from the housing when the mass is freed from the retracted twisters, and means for lubricating certain channels of the twisters following twisted singular mass removal therefrom.

11. A dough twister unit having a pair of longitudinally aligned twisters reciprocable towards and away from each other and simultaneously rotatable in opposite directions, each twister including a pair of longitudinally directed channels, the twisters when substantially abutting having their respective channels in longitudinal alignment, and a vane on each twister between and defining the channels thereof, each channel having a uniformly inclined portion coextensive with and extending from its abutting end towards its opposite end.

12. A dough twister unit having a pair of longitudinally aligned twisters reciprocable towards and away from each other and simultaneously rotatable in opposite directions, each twister including a pair of longitudinally directed channels, the twisters when substantially abutting having their respective channels in longitudinal alignment, and a vane on each twister between and defining the channels thereof, each channel having an inclined portion coextensive with and extending from its abutting end towards its opposite end, one inclined portion being substantially coextensive with the length of the channel and the other channel inclined position being less than half that length.

13. A dough twister unit having a pair of longitudinally aligned twisters reciprocable towards and away from each other and simultaneously rotatable in opposite directions, each twister including a pair of longitudinally directed channels, the twisters when substantially abutting having their respective channels in longitudinal alignment, and a vane on each twister between and defining the channels thereof, each channel having an inclined portion coextensive with and extending from its abutting end towards its opposite end, one of the channels being apertured for dough mass drag effect.

14. A dough twister unit having a pair of longitudinally aligned twisters reciprocable towards and away from each other and simultaneously rotatable in opposite directions, each twister including a pair of longitudinally directed channels, the twisters when substantially abutting having their respective channels in longitudinal alignment, and a vane on each twister between and defining the channels thereof, each channel having an inclined portion coextensive with and extending from its abutting end towards its opposite end, one inclined portion being substantially coextensive with the length of the channel and the other channel inclined position being less than half that length, the channel having the lesser length inclined portion being apertured for mass drag effect.

15. Dough handling apparatus including in combination a pair of twisting units, an auxiliary housing having an open intake end adapted to receive successive dough masses of predetermined character for both units and two diverging outlets, one outlet discharging to one unit and the other outlet discharging to the other unit, a diverter in said auxiliary housing and dough mass operable for diverting successive masses to alternate outlets, each twisting unit comprising a pair of longitudinally aligned twisters reciprocable toward and away from each other and normally in substantially abutting relation, each twister of a unit having a pair of adjacent mass receiving, longitudinally directed channels therein, the two channels of one twister of each unit being aligned with the other two channels of the other twister of that unit when the twisters of the unit are in substantially abutting relation, a diverter for each twisting unit and ahead of the twisters of that unit and below the outlet associated with that unit and dough mass operable in mass passage from the outlet to the associated twisting unit for selective supply of masses to the aligned channels of the last mentioned twisting unit, means for simultaneously rotating and separating the twisters of that twisting unit, and other means for simultaneously rotating and separating the twisters of the other twisting unit.

16. Dough handling apparatus as defined by claim 15 wherein each of the means is of reversible character, the twisters of each twisting unit following initiation of twisting operation of that unit, separating one from the other until the two dough masses in that unit are twisted together, the twisted singular dough mass then passing between the then separated ends of the twisters, the twisters then moving towards each other, and means stopping the operation of the means when the twisters of the unit controlled thereby have returned to substantially abutting relation.

17. Dough handling apparatus as defined by claim 15 wherein each pair of twisters of a twisting unit are housed within a lower housing having an open end juxtapositioned to an auxiliary housing outlet, and door means for the lower end of said lower housing and juxtapositioned to the pair of twisters therein, the twisted portion of the mutually twisting masses in the unit resting on said door means until twisting is completed, and door opening means for said door means and operable at the end of the separating movement of the pair of twisters associated with that door means and for releasing the then twisted mass from the associated lower housing when that twisted mass is freed from the retracted twisters in that housing.

18. Dough handling apparatus as defined by claim 15 wherein each of the means is of reversible character, the twisters of each twisting unit following initiation of twisting operation of that unit, separating one from the other until the two dough masses in that unit are twisted together, the twisted singular dough mass then passing between the then separated ends of the twisters, the twisters then moving towards each other, means stopping the operation of the means when the twisters of the unit controlled thereby have returned to substantially abutting relation, each pair of twisters of a twisting unit being housed within a lower housing having an open end juxtapositioned to an auxiliary housing outlet, and door means for the lower end of said lower housing and juxtapositioned to the pair of twisters therein, the twisted portion of the mutually twisting masses in the unit resting on said door means until twisting is completed, and door opening means for said door means and operable at the end of the separating movement of the pair of twisters associated with that door means and for releasing the then twisted mass from the associated lower housing when that twisted mass is freed from the retracted twisters in that housing.

19. Dough handling apparatus as defined by claim 15 wherein each of the means is of reversible character, the twisters of each twisting unit following initiation of twisting operation of that unit, separating one from the other until the two dough masses in that unit are twisted together, the twisted singular dough mass then passing between the then separated ends of the twisters, the twisters then moving towards each other, means stopping the operation of the means when the twisters of the unit controlled thereby have returned to substantially abutting relation, and means for lubricating certain channels of the twisters following singular twisted dough mass removal therefrom.

20. Dough handling apparatus as defined by claim 15 wherein each pair of twisters of a twisting unit are housed within a lower housing having an open end juxtapositioned to an auxiliary housing outlet, and door means for the lower end of said lower housing and juxtapositioned to the pair of twisters therein, the twisted portion of the mutually twisting masses in the unit resting on said door means until twisting is completed, door opening means for said door means and operable at the end of the separating movement of the pair of twisters associated with door means and for releasing the then twisted dough mass from the associated lower housing when that twisted mass is freed from the retracted twisters in that housing, and means for lubricating certain channels of the twisters following singular twisted mass removal therefrom.

21. Dough handling apparatus as defined by claim 15 wherein means is provided for each unit for supporting said twisters of that unit and operable to adjust the separating travel of said last mentioned twisters.

22. Dough handling apparatus as defined by claim 15 by the first mentioned diverter supplying successive dough masses to one and then the other of the twisting units, third mass supply to the said one unit initiating the operation of the said means therefor and the fourth mass supply to the said other unit initiating the operation of the said means therefor.

JOHN BUECHEK.